United States Patent [19]

Ionescu

[11] Patent Number: 4,955,069
[45] Date of Patent: Sep. 4, 1990

[54] A.C. POWER CONTROLLER WITH SHORT CIRCUIT AND OVERLOAD PROTECTION

[76] Inventor: Adrian F. Ionescu, 15 Swan River St., Patchogue, N.Y. 11772

[21] Appl. No.: 317,932

[22] Filed: Mar. 2, 1989

[51] Int. Cl.$^5$ .............................................. H02P 5/00
[52] U.S. Cl. ................................... 388/811; 388/903; 361/31; 361/93
[58] Field of Search ................................ 318/798-802, 318/805-811; 361/93, 31-32, 92, 95-100; 323/237-242; 388/800-804, 806, 809-811, 815, 903, 917

[56] References Cited

U.S. PATENT DOCUMENTS

| | | | |
|---|---|---|---|
| 3,879,652 | 8/1973 | Billings | 361/100 |
| 4,110,809 | 8/1978 | Cronin | 361/95 |
| 4,143,410 | 3/1979 | Cronin | 361/92 |
| 4,245,184 | 1/1981 | Billings et al. | 361/93 |
| 4,359,681 | 11/1982 | Baker et al. | 323/237 |
| 4,500,802 | 2/1985 | Janutka | 363/60 |
| 4,626,954 | 12/1986 | Damiano et al. | 361/96 |
| 4,633,161 | 12/1986 | Callahan et al. | 323/242 |
| 4,656,365 | 4/1987 | Billings | 361/56 |
| 4,740,883 | 4/1988 | McCollum | 361/100 |

*Primary Examiner*—William M. Shoop, Jr.
*Assistant Examiner*—David Martin

[57] ABSTRACT

An A.C. solid state power controller for controlling the current through a load from an alternating current source, including a diode bridge rectifier with its direct current output connected to a solid state switch, such as a MOSFET or a bipolar transistor, that is gate controlled by gate signals synchronized to the A.C. source. The gate signals are provided from an optocoupler to control the solid state switch and the load current. Overload, short circuit, and low A.C. line voltage conditions are sensed by protection circuits which signal the optocoupler to turn off the solid state switch and, thus, the load current. A fast turn off time, in the range of a few microseconds, is achieved which, together with the rectifier and solid state switch configuration, provides a power controller which is resistant to short circuit and overload destruction present in conventional A.C. solid state circuit breakers and power control devices.

23 Claims, 4 Drawing Sheets

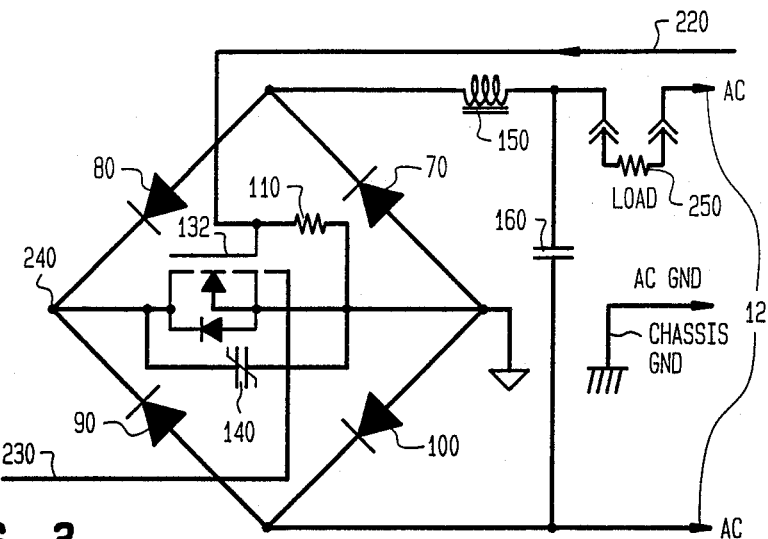
FIG. 3
FIG. 4.1 — AC VOLTAGE LINE 12
FIG. 4.2 — SYNC SIGNAL LINE 180
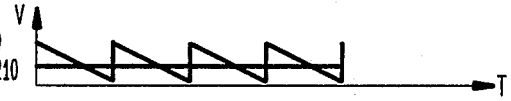
FIG. 4.3 — DESCENDANT RAMP, LINE 190; POWER CONTROL REF, LINE 210
FIG. 4.4 — PULSED VOLTAGE LINE 200
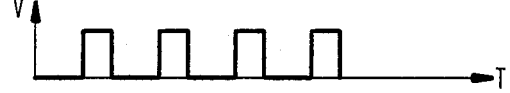
FIG. 4.5 — GATE SIGNAL LINE 220
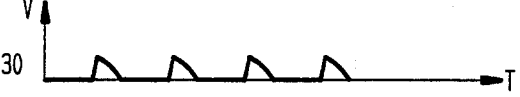
FIG. 4.6 — LOAD CURRENT SENSE, LINE 230
FIG. 4.7 — POWER MOSFET VOLT, LINE 240
FIG. 4.8 — LOAD CURRENT LINE 250

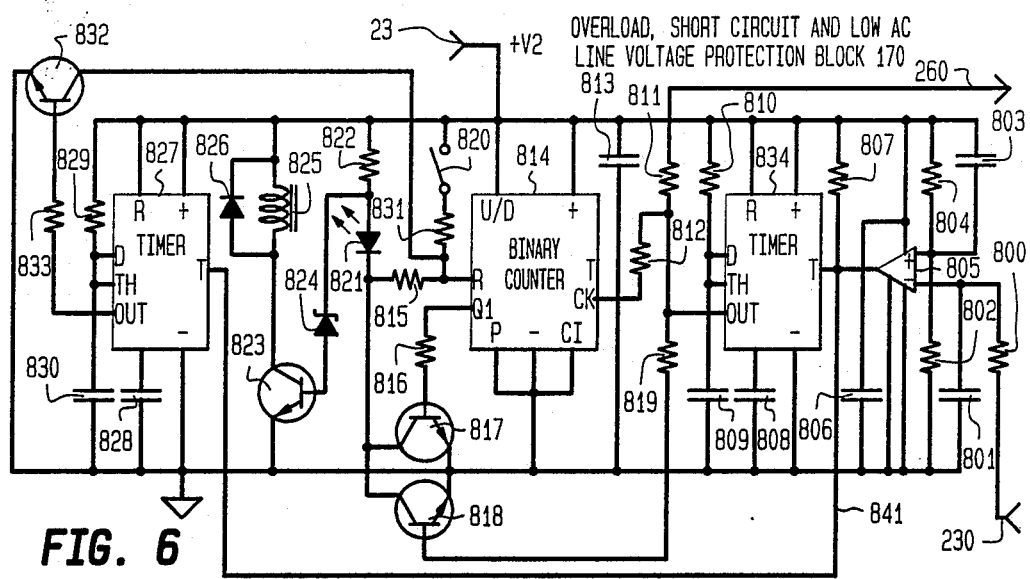
FIG. 6
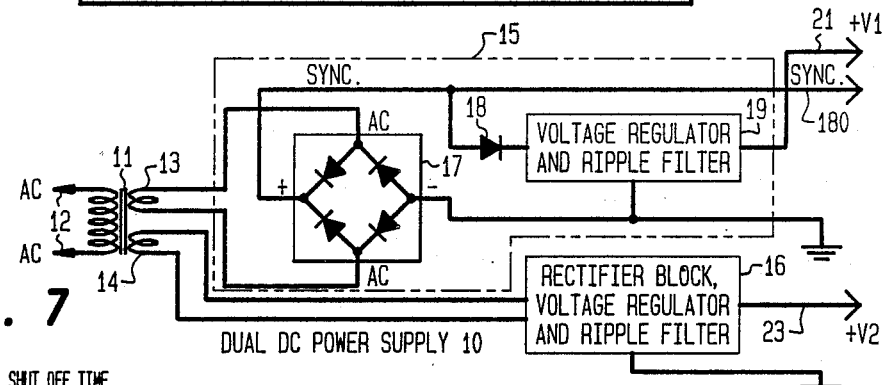
FIG. 7
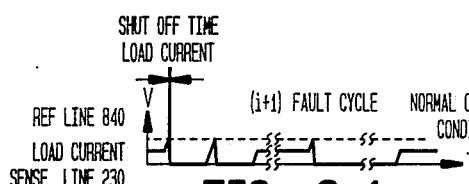
FIG. 8.1
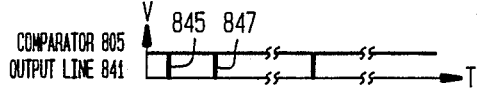
FIG. 8.2
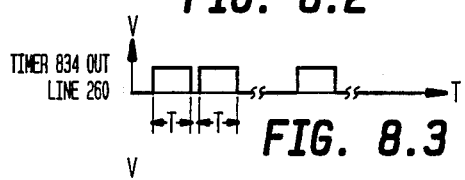
FIG. 8.3
FIG. 8.4
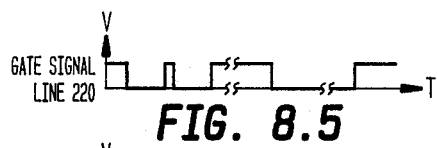
FIG. 8.5
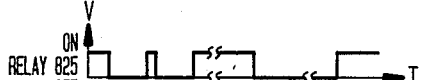
FIG. 8.6
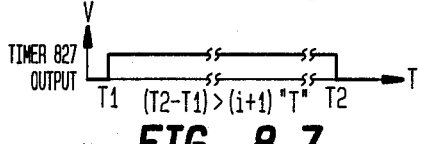
FIG. 8.7
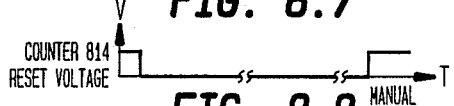
FIG. 8.8

A.C. POWER CONTROLLER WITH SHORT CIRCUIT AND OVERLOAD PROTECTION

BACKGROUND OF THE INVENTION

The present invention relates to power control circuits, and more particularly relates to circuit breakers providing overload and short circuit protection.

Presently available circuit breakers of the electromagnetic or thermal type are known to have turn off times in the range of 10 milliseconds or more. This 10 millisecond turn off time is dangerously too long in many critical circuit breaker applications, such as military, flammable or explosive environments. Furthermore, in large electrical systems, the tripped circuit breaker must be located and subsequently re-set manually in order to restore the circuit after the fault has been cleared. These problems of long turn off times and manual resetting associated with mechanical circuit breakers may be disadvantageous and very serious in applications where time is a critical factor.

The Triac is a conventional electronic power device made of silicon crystal comprising a dual sense silicon controlled rectifier (SCR) for receiving a gate signal for controlling power through a load, such as in large wattage dimmer devices. One problem associated with SCR or Triac devices in power control applications is that once the Triac is turned on, it will not turn off unless the supply voltage or current is cut off, or else turn off will not occur until the next zero crossing of the A.C. power supply. This time duration required to turn off the Triac may be as much as one half of the A.C. cycle, resulting in damaging the Triac under overload and short circuit conditions.

In the U.S. Pat. No. 4,633,161 issued to Callahan et al on Dec. 30, 1986, there is described an inductorless phase control dimmer power controller for coupling a lamp to an alternating current source. This patent is directed to the elimination of the filter inductor from the power stage of the conventional solid state electronic dimmer. Here, in this dimmer controller, the main power is dissipated in the diodes of a pair of power MOSFET due to the forward voltage drop across the FET diodes which are used as the current conducting path for the dimmer load. This results in excessively high power dissipation in the FET devices due to high voltage/high current operation in the linear mode. Thus, such inductorless dimmer power controller may be used in lower power dimmer applications, but would dissipate too much heat and burn out if employed in the higher power control circuits. This burn out occurs since the internal clamp diode, being located in the same case as the MOSFET, increases in temperature, and consequently increases the MOSFET's RDS/on, thereby increasing the dissipation on the MOSFET itself. Also, the power dissipation in the patented power control device is increased across the MOSFET since the load current rise time is increased for the purpose of eliminating the EMI filter inductor by forcing it to operate in the linear mode. Thus, by turning the FETS on slowly, as occurs when turning on the MOSFET as half cycle in the linear mode, large heat dissipation in the MOSFET will result. Furthermore, the absence of the inductor will allow fast current rises in the case of a short circuit or overload condition, faster than the response of the current limit circuit. The only element that controls the current slew rate is the line inductance. If the fault occurs at ¼ cycle, where the line voltage equals the plus or minus peak value, and the electric line to the load is short, the efficiency of the current limit circuit is questionable in view of the maximum allowed load current in the linear mode. This also contributes to the high heat dissipation in the MOSFET power control device.

In view of the above, it is an object of the present invention to provide an A.C. solid state circuit breaker with overload and short circuit protection. It is another object to provide an A.C. solid state circuit breaker with a very fast turn off time, in the range of microseconds. It is another object to provide an A.C. solid state circuit breaker which is resistant to short circuit destruction which destroys conventional solid state circuit breakers and power controllers, and which can operate in very high power ranges, such as with currents in excess of 100 amperes. It is another object to provide an A.C. solid state circuit breaker having very low power dissipation in the power control device and which operates at fast speeds.

SUMMARY OF THE INVENTION

These and other objects are achieved by the present invention which provides an A.C. solid state power controller including a rectifier with its output connected to a solid state switch, such as a MOSFET or a bi-polar transistor, that is respectively gate or base controlled for controlling power through a load. The rectifier bridge is connected to an A.C. source, with the D.C. output of the rectifier bridge being connected across the solid state switch. The switch gate is synchronized to the A.C. source and controlled by an overload and short circuit protection circuit, which senses the overload and short circuit conditions and in turn signals an optocoupler to turn off the gate voltage and the solid state switch and, consequently, turn off the load current. The overload and short circuit protection circuit includes comparator and timing means for sensing overload and short circuit conditions and in turn operating a driver clamp transistor for turning off the solid state switch and, thus, the load current.

The A.C. solid state power controller of the present invention provides a turn off time in the range of a few microseconds and may be made to reset as soon as the fault is cleared. This very fast turn off time, together with the rectifier and solid state gated switch configuration, provides a power controller which is resistant to short circuit destruction inherent in conventional A.C. solid state circuit breakers. The A.C. solid state circit breaker of the present invention also permits operation in the very high power current ranges, such as in excess of 100 amps.

BRIEF DESCRIPTION OF THE DRAWINGS

FIG. 3 is a circuit diagram of the A.C. solid state switch comprising the rectifier connected to a power sense FET as an alternate embodiment to the above described and shown MOSFET;

FIG. 4 is a composite of FIGS. 4.1 through 4.8 respectively showing signal waveforms at several signal lines in the system of the present invention, each signal being synchronized to the A.C. line voltage;

FIG. 6 is a detailed circuit diagram of the overload, short circuit and low A.C. line voltage protection circuit shown in block form in FIGS. 1 and 5;

FIG. 7 is a circuit and functional block diagram of the D.C. regulated power supply including the rectifier and voltage regulator sections; and FIG. 8 is a composite of FIGS. 8.1 through 8.8, respectively, showing signal wave forms at several signal lines in the overload, short circuit and low AC line voltage protection block shown in FIG. 6.

DESCRIPTION OF THE PREFERRED EMBODIMENTS

Figure 1:
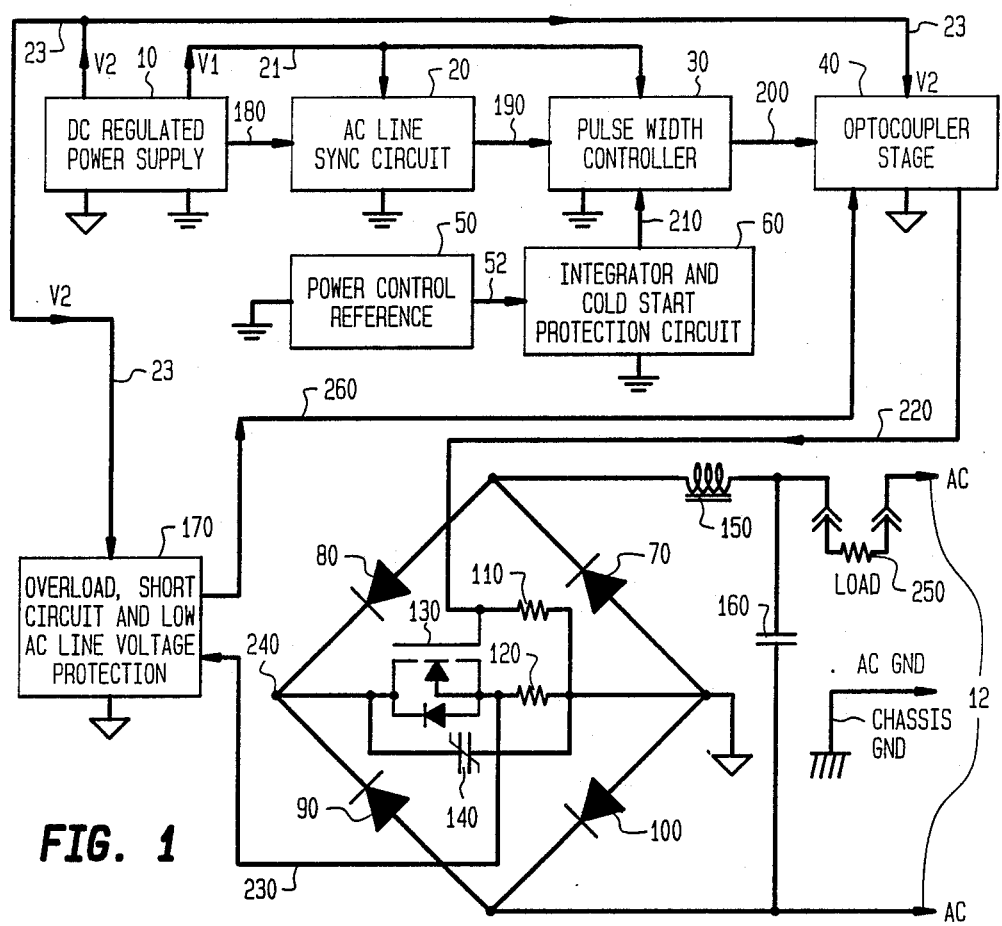
FIG. 1 is a combined functional system block diagram and circuit of the A.C. power controller with short circuit and overload protection in accordance with the present invention.

A functional system block diagram and circuit incorporating the transistorized AC power controller is shown in FIG. 1, comprising seven functional blocks operating in conjunction with the AC power control block, shown in detail. More particularly, a dual DC power supply 10 provides the necessary supply voltage for all circuitry involved in the process, including a sync signal on line 180 for an AC line sync circuit 20. The AC line sync circuit 20 generates a linear descendant ramped voltage in line 190 which reset for each AC line voltage zero crossing. Pulse width controller 30 compares the ramped voltage received on line 190 with a power control reference signal received on line 210 from an integrator and cold start protection circuit 60. A power control reference circuit 50 provides a DC reference signal on line 52 which is processed by the integrator and cold start protection circuit 60. Protection circuit 60 filters the reference voltage of any spikes or other noise that may generate errors in the pulse width controller, thereby providing a usable power control reference signal on line 210. Protection circuit 60 also provides a fast zero output power reset in case of a fault condition. The power control reference signal on line 210 increases amplitude slowly, to compensate for a slow settling time in applications such as light dimming. For the same reason, the power control reference signal's amplitude decrease speed is fast.

At any time, when the value of the ramped voltage signal on line 190 is lower than the power control reference signal on line 210, a comparator 402, to be described, provides on line 200 a current pulse which turns on an optocoupler 40. If this event occurs, a voltage pulse is applied on line 220 to the gate of a power MOSFET 130. If the load current sense signal on line 230 exceeds a preset value, the overload, short circuit and low AC line voltage protection circuit 170 will turn off the load current and reset signal on line 210 to a zero value. Protection circuit 170 will perform the same function in the event of a low AC line voltage, to prevent the power MOSFET from operating in a destructive linear mode caused by insufficient amplitude of the gate drive pulse on line 220.

Figure 2:
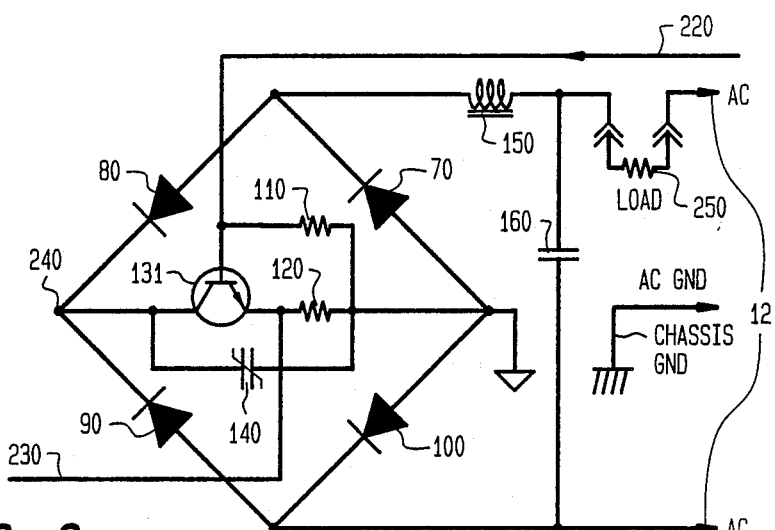
FIG. 2 is a circuit diagram of the A.C. solid state switch comprising the rectifier connected to a bi-polar transistor as an alternate embodiment to the above described and shown MOSFET.

FIG. 2 shows the bridge rectifier connected to a bipolar transistor 131 employed as the solid state switch and replaces the power MOSFET 130 shown and described with reference to FIG. 1. Here, the base of bipolar transistor 131 is connected to the output line 220 of optocoupler stage 40. The bipolar transistor 131 performs the same function 40 as the power MOSFET 130.

FIG. 3 shows another alternate embodiment of the solid state swtich wherein a power sense FET 132 replaces the MOSFET 130 and the current sensing resistor 120 shown and described with reference to FIG. 1. The power sense FET 132 is a conventional device comprising a power MOSFET with built-in current sensing capability. As shown in FIG. 3, the drain and source terminal of power sense FET 132 are connected across the direct current output of the rectifier bridge. The gate of power sense FET 132 is connected to receive the output line 220 from optocoupler 40.

FIGS. 4.1 through 4.8 are electrical signal diagrams for the lines indicated in such figures and described above, thereby illustrating the operating mode of the transistorized AC power controller.

Figure 5:
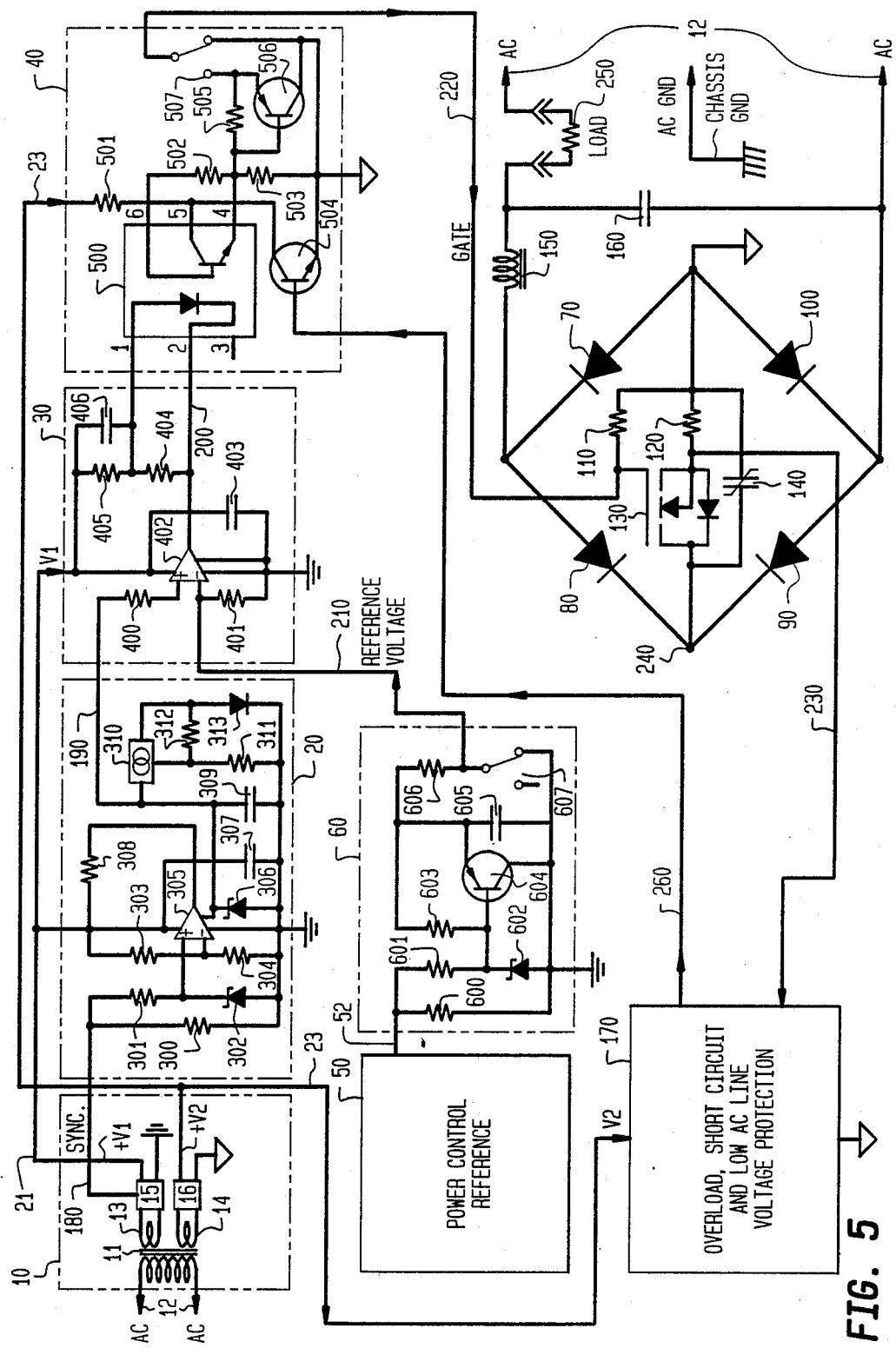
FIG. 5 shows further circuit details of the system shown in FIG. 1, particularly the circuitry included in the D.C. regulated power supply, the A.C. line sync circuit, the pulse width controller, the optocoupler stage, the integrator and cold state protection circuit, and the diode bridge and MOSFET circuit as shown in FIG. 1.

FIG. 5 shows further details of the systems block elements described and shown in connection with FIG. 1. Dual DC power supply 10 is a conventional DC power supply having a transformer 11 which receives an AC source via lines 12 and provides the required voltage v1 and v2 for control circuits and drive, power and protection circuits, as well as sync signal 180. Each DC power supply section 15 and 16 respectively receives power from secondary sections 13 and 14 and is electrically isolated from the other, by means of their individual circuit grounds, shown by respective ground symbols, and by isolated transformer secondaries, so as not to endanger any external circuitry such as remote control units or the operator. DC power supply section 15 provides a DC output v1 on its output line 21 and, as detailed in FIG. 7, consists of a full wave Schottkey rectifier stage 17, and a diode 18 which separates the output of stage 17 from the voltage regulator and ripple filter 19. DC power supply section 16 consists of a full wave rectifier, a voltage regulator and a ripple filter, and supplies power v2 on line 23 for the power stage drive circuitry as well as the protection circuitry.

The sync signal on line 180, as shown in FIG. 5, is applied to the noninverting input of a comparator 305 through a network consisting of resistors 300 and 301 and a zener diode 302. The role of this network is to regulate the low peak voltage of the full wave rectified voltage sync signal on line 180. It will also protect the input of the comparator 305 against overvoltage. The threshold voltage is set by a voltage divider comprising resistors 303, 304. If sync signal on line 180 drops below the threshold voltage, the comparator's output sends a short duration voltage pulse to the network consisting of a zener diode 306 and a capacitor 309, charging such capacitor 309 toi a maximum voltage preset by zener diode 306. Bridge rectifier stage 17 shown in FIG. 7 consists of four Schottkey diodes. Due to their low forward voltage drop, and a threshold voltage exceeding the low peak sync input voltage 180 by a small amount, there is provided a narrow output pulse from comparator 305. If the AC line voltage is other than zero, no voltage is applied on the network 306 and 309 by the comparator 305. There, the integrated circuit 310, a constant current sink, that is, a discharge current value set by resistors 311 and 312 and thermo-compensated by diode 313, will discharge the capacitor 309 in a linear descendant ramp singal on line 190 to a value above zero, for noise imunity if a remote power control feature is required. Capacitor 307 will prevent any spurious pulses at the output of comparator 305 due to switching transients. Resistor 308 sets the optimum charge time and the optimum bias current for zener diode 306.

The linear descendant ramp signal on line 190 is applied from the AC line sync circuit 30 to the pulse width controller 30 through resistor 400 to the noninverting input of comparator 402. If the amplitude of signal on line 190 drops below the power control reference signal on line 210, comparator 402 will turn the internal LED of optocoupler 500"on" via line 200 and through the network consisting of resistors 404, 405 and capacitor 406, for a fast turn on/off. Capacitor 403 de-couples the power supply input of comparator 402.

To further increase the output switching speed of optocoupler 40, resistor 502 is connected between its base and emitter. Resistor 501 sets the current in the optocoupler's output transistor and clamp transistor 504. Transistor 506 will increase the rate of the gate discharge of power MOSFET 130, if the gate is still charged with no input from the optocoupler device 500. Resistor 110 will prevent excessive gate charge due to the capacitance between drain and gate of MOSFET 130. The actual AC power switch consists of power diodes 70, 80, 90, 100 in a bridge configuration and the power MOSFET. Metal oxide varistor 140 prevents any destructive overvoltages across the power MOSFET. When the power MOSFET 130 is turned on, the voltage across it at point 340 drops to zero or to a very low value, and the output signal on sensing line 230 across current sense resistor 120 increases. Resistor 120 has a value in the range of from 5 to 20 milliohms.

In order to avoid noise injection in the AC line, an RFI filter consisting of inductor 150 and capacitor 160 is provided, as shown in FIGS. 1, 2, 3 and 5. Inductor 150 is carefully selected, due to its additional function of limiting the load current slew rate in the case of an overload or short circuit. Two factors should be taken into consideration when selecting the inductor 150. First, the load current speed increase over the specified normal operating range should be lower than the overall overload and short circuit protection loop response. This will compensate for any delays in turning off the load current. This is shown by the load voltage increase signal across load 250. The second factor to be considered is that the saturation point on the BH curve should not occur unless a higher current value than "maximum before cut off" is reached.

The power control reference circuit 50 provides the power control reference voltage on line 52 to the integrator and cold start protection circuit 60 consisting of resistor 601 and Zener diode 602 in order to limit its value below any destructive levels. The time constant of resistor 601, resistor 603 and capacitor 605 will set the load current speed increase, due to large differences in the thermal lag of different loads. If the power control reference voltage on line 52 is lower than the voltage across the capacitor 605, the voltage at the base of transistor 604 is lower than its emitter's voltage, thereby turning the transistor on. As a result, capacitor 605 will discharge rapidly to a voltage equal to the power control reference voltage on line 52. A slow load current turn on avoids any overload conditions and will not activate the overcurrent protection circuit 170. A fast power control reference voltage on line 52 will force a new slow load current turn on, if the load current is externally restored.

Due to large differences in the thermal lag, as in the case of light dimming applications, of different loads, the decrease time of the control reference voltage on line 210 out of protection circuit 60 is much faster than the increase time. This is designed to compensate for the slow load settling speed and not activate the over load protection circuit 170.

Referring to FIG. 6, the load current sense signal on line 230 is filtered by resistor 800 and capacitor 801 of the overload short circuit and low AC line voltage protection circuit 170 and applied to the inverting input of comparator 805. An overload/short circuit current limit reference line 840 is set by voltage divider resistors 804 and 802. Capacitor 803 will filter this reference of any voltage spikes or other noise. In the event of a load fault, such as an overload or short circuit, where the load current is higher than a pre-set value, the load sense signal 230, shown in FIG. 8.1, will exceed the reference on line 840, and comparator 805 will send a "low" pulse 845 (FIG. 8.2) pulse to the trigger input pin T of timer 834. Capacitor 806 will decouple the DC power supply voltage across comparator 805. The output of timer 834 will turn high (FIG. 8.3) for a time "T" as set by capacitor 809 and resistor 810, turning on clamp transistor 504 as shown in FIG. 5. Clamp transistor 504 is turned on via resistor 811 by the signal on line 260 and will cut off the voltage on the output of the optocoupler device 500, (FIG. 8.4), the network consisting of resistors 503, 505, and transistor 506 to thereby discharge the gate of the power MOSFET 130 (FIG. 8.5), turning off the load current. After time "T", the output of timer 834 will turn low again, and the load current will be restored. When timer 834 is triggered, timer 827 is also triggered via common connection 841 and its output turns high for amounts larger than (i+1) "T", turning on transistor 832 through resistor 833. This will change the voltage on the reset inut of counter 814 to zero. The counter reset pin is kept high through resistor 822, Zener diode 821 and resistor 815. As a result, the reset function is disabled, and the counter 815 is able to start counting pulses.

As shown in FIG. 6, the output of timer 834 will also apply high pulses to the clock input (Ck) of counter 814 through resistor 812 and will turn transistor 818 on through resistor 819. Transistor 818 will simulate a low D.C. power supply voltage and turn transistor 823 off, and such transistor 823 will turn off the relay 825. Relay 825 consists of its coil as shown at 825 which activate the contact switches 507 and 607, shown in FIG. 5 in the off position. The turning off of relay 825 (FIG. 8.6) disconnects the power MOSFET's gate via line 220 and the power control reference voltage 210. Relay 825 may be replaced by a dual optocoupler or other solid state switch, not shown, with minor circuit modifications.

After time "T", the output (out) of timer 834 will turn low, transistors 504 and 818 will be turned off, as shown in FIGS. 5 and 6, and the load current will be restored. If the fault persists, the output of comparator 805 will send a new low pulse 847 (FIG. 8.2) to timer 834, turning its output high for another time "T" (FIG. 8.3). Counter 814 will receive a new clock pulse, counting it. Transistor 818 will be turned on again, simulating a new D.C. power supply malfunction or a low A.C. line voltage. As a result, relay 825 will be turned off again (FIG. 8.6) by transistor 823. Timer 827 had been triggered by the first fault cycle, transistor 832 is still on, and the counter reset function is off (FIG. 8.7).

If, after the (i+1) number of fault cycles, the overload or short circuit condition still persists, the Qi output of counter 814 becomes high, thereby turning transistor 817 on. Transistor 817 will act identically to transistor 818, turning transistor 823 and relay 825 off. This will not permit an automatic restoration of load current, since no new fault cycles are possible. The output state of counter 814 cannot be changed unless a new pulse is applied to the clock input or reset switch 820 (FIG. 8.8) applies a positive voltage to the reset input R of counter 814 via resistor 831. The manual reset is possible only after time (i+1)T, when transistor 832 is off, thereby allowing the presence of positive voltage on the reset input R of counter 814. Before time (i+1)T, the automatic reset function is disabled by transistor 817 which has been latched on.

If, after time (i+1)T from a fault event, the load current stays on, the output of timer 827 becomes low, and transistor 832 turns off, thereby resetting the counter 814. The circuit values determining the time (i+1)T are chosen to reset the counter for non-repetitive faults.

If the A.C. line voltage drops below a certain value, the D.C. supply voltage V2 becomes too low, forcing the power MOSFET 130 to operate in a destructive linear mode. In the system of the present invention, as shown in FIG. 6, if the D.C. supply voltage V2 drops below the voltage of Zener diode 824, the transistor 823 will turn off, thereby turning off the relay 825 and disconnecting the power control reference voltage 210 via relay contact 607, as shown in FIG. 5. In this manner, the power MOSFET 130 is protected from destruction.

In general, the operation of the A.C. power controller is summarized as follows. The A.C. line voltage on line 12 crosses the zero crossing 120 times per second. For each crossing, the capacitor 309 in the A.C. line sync circuit 20 is charged to a pre-set voltage, and then discharged to a "V" value, above zero, for noise immunity, by the constant current sink circuit including capacitor 309, integrated circuit 310, resistors 311 and 312, and diode 313 in the A.C. line sync circuit 20. As a result, the output line 190 is a linear descendant ramp that is reset for each A.C. line voltage zero crossing. Next, the descendant ramp voltage on line 190 is applied to the pulse width controller 30 where it is compared with the power reference control signal on line on line 210 to provide the pulse width control signal on line 200. If the descendant ramp voltage on line 190 becomes lower than the reference voltage on line 210, the optocoupler 500 is turned on by the pulse width signal on line 200 out of the comparator 402. This latter operation is the primary function of the pulse width controller 30.

The output transistor 506 of optocoupler stage 40 will charge the gate of the power MOSFET 130 up to a voltage of over 10 volts, turning it on. MOSFET 130 is forward connected diagonally to to the D.C. output 240 of the rectifier bridge. The A.C. input of the bridge is similar to a switch terminal. To avoid any damage due to high voltage transients, the metal oxide varistor 140 is connected across the power MOSFET 130.

An RFI LC filter consisting of inductor 150 and capacitor 160 is connected between the load 250 and rectifier-switch combination to thereby reduce any possible switching noise in the A.C. line. Inductor 150 also functions to limit the load current slew rate in case of an overload or short circuit.

If, due to large AC voltage variations, the V1 and V2 voltages on lines 21 and 23 drop below a certain safe level, which would push the power MOSFET 130 into a destructive linear mode, the MOSFET gate is disconnected from the driver stage and discharged. Also, the control reference voltage on line 210 is cut off. As stated above, the reference recovery time is much longer than the decay time, if all faults are clear.

If the load current at 250 exceeds a preset value on line 840, the comparator 804 in overload circuit 170 will send a "low" pulse to the timer circuit 834 set for one second. The output of the timer 834 turns on the driver clamp transistor 504 which turns the MOSFET gate voltage to zero. At the same time, the comparator 805 sends a pulse to counter 814. After T seconds, the load current 250 will reset. If the fault still exists, a new timing cycle will begin and a second pulse will be sent to the counter 814. After "(i+1)" number of attempts to restore the load current, if the fault still exists, the counter 814 output will permanently shut the optocoupler drive circuit off, requiring system troubleshooting and manual reset. For example, if after the second cycle, the fault such as a temporary short circuit caused by a lamp burnout, is terminated, the system will operate normally since the counter 814 will be automatically reset to zero after (i+1)T seconds. Therefore, no permanent shut off will take place.

In the system of the present invention, the load current shut off time is extremely short, in a range of a few microseconds, protecting the power control devices 130, 131 or 132 against self destruction if maximum load current is exceeded. It also provides a presently nonexisting safety feature in any commercial, industrial, hazardous and military AC power applications. It provides protection against expensive self destruction, expensive building repair in case of fire caused by short circuit. It provides protection against loses of human lives caused by fire, explosion or other electric related accidents.

While the invention has been described above with respect to its preferred embodiments, it should be understood that other forms and embodiments may be made without departing from the spirit and scope of the present invention.

What is claimed is:

1. An A.C. solid state power controller for controlling current through a load from an alternating current source connected to said load, comprising:
   a rectifier bridge having alternating current input terminals connected to said load and said alternating current source such that said rectifier bridge, said load and said alternating current source are connected to provide a load current path therethrough, said rectifier bridge including direct current output terminals;
   solid state switch means connected between said direct current output terminals of said rectifier bridge including a D.C turn on and turn off control gate for turning on and turning off said solid state switch means and permitting current flow therethrough and thereby permitting said current from said alternating current source to flow in said load current path through said load, said solid state switch means being directly turned off by said control gate to thereby prevent said load current path through said rectifier bridge and said load;
   gate signal generating means, synchronized to said alternating current source, for providing a gate signal to said control gate for operating said solid state switch means for turn on or turn off thereof; and circuit protection means, responsive to said current through said load, for providing, independent of the value of line voltage of said alternating current source, a turn off signal to said gate signal generating means whereby said solid state switch means is opened to thereby prevent said load current path through said rectifier bridge and said load and turn off said load current.

2. An A.C. solid state power controller as recited in claim 1, wherein said circuit protection means includes means for detecting overload and short circuit conditions in said load current.

3. An A.C. solid state power controller as recited in claim 2, wherein said means for detecting overload and short circuit conditions includes a current sensing resistor connected to said solid state switch for sensing an indication of said load current, comparator means for comparing the current sensed by said current sensing resistor with a predetermined safe value, and timing means connected to said comparator for indicating when said sensed current exceeds said predetermined safe value for a predetermined time.

4. An A.C. power controller as recited in claim 1 wherein said gate signal generating means includes a driver clamp transistor for turning off said gate signal.

5. An A.C. power controller as recited in claim 1 further comprising an A.C. line sync circuit for generating a linear descendant ramped voltage which is reset for each A.C. line voltage zero crossing, a pulse width controller for comparing said ramped voltage with a power control reference signal, and a pulse generator for generating said gate signal whenever said ramped voltage is lower than said power control reference signal, whereby said gate signal in the form of a voltage pulse is applied to said control gate for operating said solid state switch.

6. An A.C. power controller as recited in claim 1 wherein said circuit protection means includes means for determining when an overload condition exists, means for detecting when an overload condition has been cleared after a predetermined time, and means for automatically resetting said gate signal generating means after said overload condition has been cleared.

7. An A.C. power controller as recited in claim 1 wherein said solid state switch means comprises a MOSFET having its terminals connected between said direct current output terminals of said rectifier means.

8. An A.C. power controller as recited in claim 7 further comprising a gate resistor connected between the gate of said MOSFET and ground to prevent excessive gate charge.

9. An A.C. power controller as recited in claim 7 further comprising a metal oxide varistor connected in parallel with said MOSFET for protecting said MOSFET.

10. An A.C. power controller as recited in claim 1, wherein said solid state switch means comprises a bipolar transistor connected between said direct current output terminals of said rectifier means, said bipolar transistor having a base terminal which constitutes said control gate for receiving said gate signal.

11. An A.C. power controller as recited in claim 1, wherein said solid state switch means comprises a power sense FET having a source and drain terminal connected across said direct current output terminals of said rectifier bridge, and a gate terminal which constitutes said control gate connected for receiving said gate signal.

12. An A.C. power controller as recited in claim 1, wherein said gate signal generating means includes a pulse width controller for adjusting said gate signal and, consequently, the on state of said solid state switch means thereby affecting the average value of load current over a period of time.

13. An A.C. power controller as recited in claim 1, further comprising a control voltage means in said gate signal generating means for controlling said gate signal and the on state of said solid state switch.

14. An A.C. power controller as recited in claim 13, wherein said control voltage means includes a reference voltage.

15. An A.C. power controller as recited in claim 1, wherein said circuit protection means includes automatic reset means for automatically resetting said gate signal generating means and said solid state switch means after a predetermined time T from when an overload condition has caused said circuit protection means to provide said turn off signal, said automatic reset means being recycled by repeatedly attempting to restore current through said load and to shut off said gate signal for a predetermined period of time if said overload condition continues after each reset cycle, and to shut off said solid state switch means and said load current permanently if said overload condition continues after a given number of reset cycles.

16. An A.C. solid state power controller for controlling current through a load from an alternating current source connected to said load, comprising:

a rectifier bridge having alternating current input terminals connected to said load and said alternating current source such that said rectifier bridge, said load and said alternating current source are connected to provide a load current path therethrough, said rectifier bridge including direct current output terminals;

solid state switch means connected between said direct current output terminals of said rectifier bridge, including a D.C turn on and turn off control gate for turning on and turning off said solid state switch means and permitting current flow therethrough and thereby permitting said current from said alternating current source to flow in said load current path through said load, said solid state switch means being directly turned off by said control gate to thereby prevent said load current path through said rectifier bridge and said load;

gate signal generating means, synchronized to said alternating current source, for providing a gate signal to said control gate for operating said solid state switch means for turn on or turn off thereof; and control means for controlling said gate signal generating means whereby said solid state switch means is turned on or off by said gate signal to respectfully close or open said load current path through said rectifier bridge and said load to control said load current.

17. An A.C. power controller as recited in claim 16, wherein said control means includes a control voltage means for controlling said gate signal and the on state of said solid state switch.

18. An A.C. power controller as recited in claim 17, wherein said control voltage means includes a reference voltage.

19. An A.C. power controller as recited in claim 16, wherein said control means includes circuit protection means for detecting overload and short circuit conditions in said load current.

20. An A.C. solid state power controller as recited in claim 19, wherein said circuit protection means includes means for sensing and indication of said load current, comparator means for comparing the current sensed by said means for sensing said load current with a predetermined safe value, and said said gate signal generating means being responsive to said comparing means, for turning off said solid state switch when said predetermined safe value is exceeded by said sensed current.

21. An A.C. power controller as recited in claim 16, further comprising an A.C. line sync circuit for generating a linear descendant ramped voltage which is reset for each A.C. line voltage zero crossing, a pulse width controller for comparing said ramped voltage with a power control reference signal, and a pulse generator for generating said gate signal whenever said ramped voltage is lower than said power control reference signal, whereby said gate signal in the form of a voltage pulse is applied to said control gate for operating said solid state switch.

22. An A.C. power controller as recited in claim 19, wherein said circuit protection means includes means for determining when an overload condition exists, means for detecting when an overload condition has been cleared after a predetermined time, and means for automatically resetting said gate signal generating means after said overload condition has been cleared.

23. An A.C. power controller as recited in claim 19, wherein said gate signal generating means includes a pulse width controller for adjusting said gate signal and, consequently, the on state of said solid state switch means thereby affecting the average value of load current over a period of time.

* * * * *